United States Patent [19]

Barker

[11] 3,714,330

[45] Jan. 30, 1973

[54] TREATMENT OF PHOSPHORIC ACID TO RECOVER ALKALI METAL FLUOSILICATES

[75] Inventor: James E. Barker, Freehold, N.J.

[73] Assignee: Cities Service Company, New York, N.Y.

[22] Filed: Aug. 14, 1970

[21] Appl. No.: 63,949

[52] U.S. Cl. ............423/321, 423/313, 423/317, 423/341, 423/481
[51] Int. Cl.....C01b 25/22, C01b 25/16, C01b 33/32
[58] Field of Search ..23/88, 165, 107, 154; 423/321, 423/313, 317, 341, 481, 488

[56] References Cited

UNITED STATES PATENTS

| | | | |
|---|---|---|---|
| 2,162,657 | 6/1939 | Wehrstein | 23/107 |
| 2,174,158 | 9/1939 | Kepfer | 23/107 |
| R25,455 | 10/1963 | Lobdell | 23/154 X |
| 3,393,044 | 7/1968 | Blumberg et al. | 23/107 |
| 3,186,809 | 6/1965 | Kreevoy | 23/154 X |
| 3,493,336 | 2/1970 | Milling | 23/107 |
| 3,462,242 | 8/1969 | Barker et al. | 23/88 |
| 3,506,394 | 4/1970 | Okamura et al. | 23/88 |
| 3,554,694 | 1/1971 | Barker et al. | 23/88 |

*Primary Examiner*—Edward Stern
*Attorney*—Richard J. Geaman

[57] ABSTRACT

Alkali fluosilicates can be recovered from wet process phosphoric acid without contaminating the acid with additional anions, by reacting phosphoric acid with an alkali metal salt, such as sodium chloride, to form the corresponding alkali metal phosphate; extracting the mixture with an organic amine, to remove the contaminating anion; reacting the resultant phosphate solution with wet process phosphoric acid to precipitate an alkali metal fluosilicate, and separating the fluosilicate, thereby leaving residual phosphoric acid. Both the phosphoric acid and the fluosilicate are substantially free of contaminating anion. A portion of the treated phosphoric acid can be recycled for reaction with additional alkali metal salt.

6 Claims, No Drawings

TREATMENT OF PHOSPHORIC ACID TO RECOVER ALKALI METAL FLUOSILICATES

BACKGROUND OF THE INVENTION

This invention relates to an improved process for preparing alkali metal fluosilicates and recovering a phosphoric acid solution substantially free of contaminating anions. More specifically, it relates to an improved method of recovering an alkali metal fluosilicate from wet process phosphoric acid (WPA) by treating WPA with an alkali metal phosphate to precipitate the alkali metal fluosilicate. In a preferred embodiment, the alkali metal phosphate is prepared by the addition of an alkali metal salt to phosphoric acid, extracting the solution with an immiscible organic amine to remove the protonated anion. The thus-formed solution of alkali metal phosphate in phosphoric acid can then be added to wet process phosphoric acid to precipitate alkali metal fluosilicate. The resulting phosphoric acid is characterized by a reduced concentration of fluosilicate and other anions. This invention is an improvement over the process described in my earlier U. S. Pat. No. 3,462,242.

Wet process phosphoric acid (WPA) is produced by the acidulation of naturally occurring phosphate materials, such as phosphate rock which ordinarily contains about 4 percent by weight of combined fluorine.

Numerous processes for reducing the fluoride concentration of WPA have been developed. These include precipitation and filtration of the fluorides, steam or air stripping of the fluorides and simple concentration of the acid, in the course of which volatile fluorides are evolved. One prior art practice is to volatilize about half of the fluorine as $SiF_4$ during the concentration of the primary acid to the final merchant grade. This tetrafluoride is collected and converted to fluosilicic acid by scrubbing the volatilized gases with water. The resulting dilute fluosilicic acid is reacted with an alkali metal or alkaline earth metal salt or hydroxide to form a fluosilicate precipitate which is recovered by filtration and is washed and dried. This process is inefficient in that only about half of the fluorine value is recovered, and the scrubbers required to prevent excessive pollution are expensive and complicated. An alternate method proposed includes the addition of an alkali metal carbonate, hydroxide or phosphate to the WPA to precipitate the alkali metal fluosilicate. In this latter method, however, the resulting alkali fluosilicate is contaminated with gypsum and other insoluble materials from the acid, requiring subsequent purification by digesting soluble materials with fluosilicic acid. Additionally, in precipitating the fluorine values from WPA by the addition of alkali, the phosphoric acid is neutralized to some extent, producing unwanted alkali phosphate. To keep the formation of alkali phosphate to a minimum, a stoichiometric amount of alkali is added to the wet process phosphoric acid in quantities sufficient to precipitate substantially all of the fluosilicate. This precipitate, as obtained by prior art techniques, is extremely difficult to separate from the acid because it is quite gelatinous, has a low rate of crystal growth and a slow settling rate.

In these processes, however, the use of chemicals such as hydroxides, carbonates and phosphates results in higher operating expenses. When the less-expensive naturally occurring alkali metal salts are used, the resultant phosphoric acid filtrate contains undesirable anions, contaminating the acid for certain applications and thus rendering it less useful. By the practice of this invention it is possible to employ the alkali metal salts to remove an alkali metal fluosilicate from wet process acid and leave a phosphoric acid solution substantially free of contaminating anions.

SUMMARY OF THE INVENTION

As indicated, an improved treatment of phosphoric acid for the recovery of alkali metal fluosilicates without contaminating the acid with additional anion has been found. This improved treatment comprises the steps of : (a) reacting an alkali metal salt with clarified phosphoric acid, (b) contacting the resulting phosphoric acid solution, which contains the alkali metal phosphate and the protonated anion, with an immiscible organic amine, to remove the anion without substantially altering other characteristics of the phosphoric acid solution, (c) contacting the phosphate solution resulting from step (b) with wet process phosphoric acid, to precipitate an alkali metal fluosilicate, and (d) separating the supernatant phosphoric acid solution from the fluosilicate precipitate.

This process for recovering a metal fluosilicate from dilute wet process phosphoric acid by using some common salts is accomplished without contaminating the phosphoric acid system with the anion of these added salts. In contradistinction to the prior art teaching of the direct addition of a metal salt to the wet process phosphoric acid to precipitate the metal fluosilicate, this improved process is characterized by the treatment of clarified phosphoric acid with an alkali metal salt to form an alkali metal phosphate solution and thereafter contacting this solution with an immiscible organic amine or an anion exchange resin to selectively extract contaminating anions from the solution. The resultant alkali metal phosphate solution, having a reduced content of contaminating anion, is then contacted with WPA, to precipitate the alkali metal fluosilicate. Both the fluosilicate product and the resultant phosphoric acid from this treatment are characterized by a significantly reduced content of contaminating anion.

As used herein, the term "anion" means the anion component of the alkali metal salt added to the phosphoric acid. Thus, if sodium nitrate is added, the nitrate ion is the anion that is selectively extracted from the acidic mixture. The term "anion" does not include the phosphate ion.

As used herein, the term "clarified phosphoric acid" refers to phosphoric acid from which no alkali metal fluosilicate will precipitate upon addition of an alkali metal salt.

Although a variety of alkali metal salts is useful within the scope of the present invention, economics of the overall process dictate that the less expensive salts are preferable. Any of the common alkali metals, including lithium, sodium, potassium, rubidium and cesium, can be used in this process. However, sodium and potassium are preferred due to their wider occurrence and availability. Sodium is particularly preferred because sodium fluosilicate has a very broad range of commercial uses. For the anion portion of the salt, halides, such as chloride, bromide and iodide, and nitrate and sulfate ions can be used. Other anions can be used, provided that the protonated form be more reactive toward the amine extractant than is phosphoric acid since, in the acid form, these anions react with the amine extractant and are thus effectively removed from solution. The alkali metal chlorides are commercially available compounds, and chloride is therefore the preferred anion, although other halide ions, as well as nitrate and sulfate, can be used. Thus, such inexpensive and readily available alkali metal salts as sodium chloride and potassium chloride are particularly preferred.

The clarified phosphoric acid to which the alkali metal salt is added can come from any convenient source, and its composition can vary over a rather substantial range. Thus, furnace acid as well as WPA can be used and the $P_2O_5$ content can range from about 5 percent to about 62 percent by weight. When WPA is used, alkali metal fluosilicates must first be removed. Such compounds can be removed by precipitation and filtration, and the clarified acidic filtrate then contacted with additional alkali metal salt, with extraction of protonated anion by an immiscible organic amine being the subsequent step. In another preferred embodiment, wet process acid that has previously been clarified as described (contacted with a sodium phosphate solution, followed by removal of the fluosilicate precipitate,) can be used as the acid source.

The concentration of the clarified phosphoric acid to which the alkali metal salt is added can vary over a wide range, such as from a low of about 5 percent to a high of about 62 percent by weight of $P_2O_5$. A 5 percent concentration is somewhat dilute and requires additional processing, such as removal of water, of the final solution. A 62 percent concentration is characteristic of the product obtained from the oxidation of phosphorus and hydration of the resulting $P_2O_5$. A feed acid of this concentration is preferably diluted for better reactivity. It is generally more convenient to employ a phosphoric acid having a $P_2O_5$ concentration of from about 15 to about 35 percent, since a 15 percent concentration is not so dilute as to require extensive processing. Further, when the concentration rises above about 35 percent $P_2O_5$, the solubility of both monosodium phosphate and alkali metal salt in the acid decreases.

The alkali metal salt and the clarified phosphoric acid can be combined and mixed in any convenient manner. The amount of salt used is the stoichiometric amount needed to furnish cation concentration necessary to form the fluosilicate precipitate. In a preferred embodiment the mixing of these reactants is accomplished by mixing in the presence of the amine extractant, as is the case when a mixer-settler arrangement is employed. For example, the solubility of KCl in 30 percent $P_2O_5$ acid is about 6 percent. Thus, if the salt, acid and amine extractant are mixed together, the amine reacts with the HCl formed, promoting the dissolution of additional salt. The alkali metal salt can be added in various physical forms. For example, solid alkali metal salt having a particle size in the general range of from about 325 mesh to about 20 mesh can be added to the acid. If the particles are much finer than 325 mesh, dusting problems arise. If the particles are larger than about 20 mesh, the rate of solution of the salt in the acid is lowered, thus limiting the throughput. In another embodiment, a slurry of salt and water can be added to the mixer-settler apparatus, wherein the action of the amine extractant in removing the protonated anion encourages dissolution of the salt particles. If concentrated phosphoric acid is used, an aqueous solution of the salt can be added, simultaneously introducing the salt and diluting the acid so that it is able to hold more alkali metal phosphate in solution.

The temperature at which the alkali metal salt and the clarified phosphoric acid can be contacted is not critical and can vary over a rather broad range. Thus, the temperature can range from about 30° to about 215° F., preferably from about 100° to about 170° F. It is obvious that, as a general rule, at lower temperatures the reaction will be somewhat sluggish while at higher temperatures one may encounter problems of corrosion and/or undesirably vigorous reaction.

Following the reaction of alkali metal salt with clarified phosphoric acid, the reaction mixture is contacted with an immiscible organic amine, to selectively extract the anion. A wide variety of amine extractants can be used in this extraction process. These extractants are, in general, secondary or tertiary amines, particularly those containing hydrocarbon groups of approximately six to 24 carbon atoms, such as tricaprylamine and 1-dinonylamino-2-dodecanol. The amines are generally aliphatic in character although they may be partially aromatic. The aliphatic hydrocarbon groups can be straight chained or branch chained, saturated or unsaturated. In addition, it is possible to use amines containing one or more branch chained alkyl groups and/or one or more straight chained alkyl groups. Typical amines which may be used for this purpose can be represented by the following formula:

(1) 

in which $R_1$ is an aliphatic hydrocarbon group having a tertiary carbon atom at the point at which it is attached to the nitrogen atom. The substituents attached to this tertiary carbon atom are alkyl groups totaling from 11 to 14 carbon atoms in the three alkyl groups. $R_2$ is a straight chain, saturated alkyl group containing from about eight to about 14, preferably about 12, carbon atoms. Compounds of this type are commercially available on the market.

Another class of amines useful within the scope of this invention can be represented by the formula:

(2) 

in which $R_1$ is as above described and $R_3$ is the group:

(3) 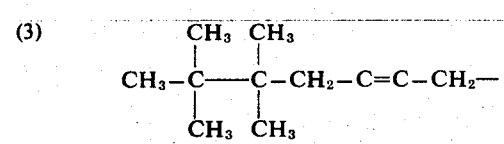

Compounds of this type are readily available on the market.

The above amine extractants are liquid. In another embodiment of this invention, the extractant can be present in the form of an anion exchange resin, in which amine groups are attached to a resin backbone. Such exchange resins are stable solids and can be used in bed form. Such use eliminates phase separation operations encountered with the liquid amines.

Additionally, many amine compounds which are suitable within the scope of this invention will be immediately apparent to those skilled in the art. The nature of the amine employed is not critical. However, the amine is desirably oil soluble and both the amine selected and its salts should be water insoluble, since they are employed in a water-immiscible organic phase. In general, the total carbon content of the amine can vary from about 22 to about 60 carbon atoms, in which at least one chain contains from about six to about 24 carbon atoms.

Insofar as the selected liquid amine and its salt are compatible with many organic solvents, the selection of a diluent for the amine is primarily a matter of convenience. Kerosene has been found to be a highly satisfactory solvent. However, the diluent can be selected from a wide variety of materials such as aromatic, naphthenic or aliphatic hydrocarbons, or a chlorinated solvent or other nonreactive solvent such as chloroform, benzene and the like.

The quantity of the amine employed can vary over a broad range. The preferred amount of amine is that which will react stoichiometrically with the anion formed. Excess amine will react with phosphoric acid, resulting in loss of phosphate values. If less than the stoichiometric amount of amine is used, some of the protonated anion will not be removed, leaving contaminating anions in the solution. When dispersed in a solvent, the amine concentration can vary broadly from as low as 1 percent to as much as about 99 percent, preferably from about 10 to about 20 percent. If the amine concentration is much lower than 10 percent, the increased dilution requires more and/or larger sized equipment for a given throughput. If the concentration is much over 20 percent, physical losses of the amine increase.

Subsequent to extraction, the amine extractant can be regenerated with a basic medium, such as sodium carbonate, sodium hydroxide, ammonium hydroxide or even dry ammonia gas. It is frequently convenient to use a lime or magnesia slurry. From an economic consideration, a slurry of lime and water is particularly desirable to regenerate the free amine, which can be recycled for further extraction. The brine obtained on regenerating the organic amine with lime and water is usually discarded.

There are various methods available for contacting the amine extractant with the alkali metal phosphate solution. One of the more convenient methods is countercurrent extraction, preferably using more than one stage for more complete extraction. These contacting techniques are well known and will not be described further.

One embodiment of this invention is the addition of an alkali metal salt, such as sodium chloride, to a stream of clarified phosphoric acid, to form a solution of an alkali metal phosphate in phosphoric acid and a protonated anion such as hydrogen chloride. This mixture is then extracted by an amine compound, such as an immiscible organic amine or an anion exchange resin. The protonated anion in the mixture preferentially reacts with the amine extractant, with the resultant immiscible amine-anion reaction product being effectively removed from the phosphoric acid solution. The resultant solution of alkali metal phosphate and phosphoric acid characterized as having a formula approximating $MH_2PO_4 \cdot H_3PO_4$, where M is the alkali metal, is then used to contact a stream of raw wet process phosphoric acid, the alkali metal phosphate reacting with the fluosilicate in the WPA stream to form a metal fluosilicate which precipitates. The supernatant phosphoric acid, which is readily recovered, and the fluosilicate precipitate both have reduced chloride ion content.

The fluosilicate precipitate will typically be in the form of a settled mud which is conveniently passed to a classifier, filter and drier, to result in a commercially acceptable alkali metal fluosilicate product. The clarified acid which has been removed from the fluosilicate precipitate can, of course, in one embodiment be recovered as a product. In another embodiment, however, part of the clarified acid is removed and recycled in the process. Thus, a portion of the clarified acid is combined with a metal salt such as sodium or potassium chloride. The solution so obtained can be selectively extracted as described above to remove residual anion in the form of, for example, hydrogen chloride, which is extremely corrosive in further processing and lowers the grade of the final product if not removed. The treated acid solution can be be recycled for treatment with the WPA.

Subsequent to extraction, the immiscible phases can readily be separated. The acidic alkali metal phosphate solution can be recycled for mixing with raw WPA to precipitate the fluosilicate as described herein. The organic amine phase can be contacted with a basic stripping agent, as described, to remove the acid form of the contaminating anion.

In one embodiment of the invention, wet process phosphoric acid is fed into a reactor, together with a phosphoric acid-alkali metal phosphate solution obtained as described above. The wet process acid and the alkali metal phosphate-phosphoric acid solution are continually agitated, stirred or mixed by conventional means. In a preferred embodiment, agitation is characterized by a Reynolds number from about 7600 to about 8300 as taught in my earlier U. S. Pat. No. 3,462,242, which teaching is incorporated by reference herein.

Where the agitation is characterized by a Reynolds number below 7600, there is insufficient and inadequate mixing of the reactants. Alternatively, where the agitation is above about that characterized by a Reynolds number of 8300, it is found that the particle size is finer than is desirable and that difficulty is encountered during subsequent separation. The precipitate of alkali metal fluosilicate, when formed at a more severe mixing rate, is extremely difficult to filter and purify.

The temperature maintained during mixing is generally in the range from about 100° F. to about 200°

F., with the range of from about 140° F. to about 160° F. being preferred. Below about 100° F., the reaction rate for forming the fluosilicate is lower than the rate at the preferred temperature. On the other hand, at 200° F. certain components of the acidic mixture, for example HF, can be expelled, leading to air pollution and reducing the yield of the fluosilicate. The mixture can be retained in the mixer for a period of from about 5 minutes to about 2 hours, preferably from about 15 to about 30 minutes. The mixing time is generally inversely proportional to the mixing temperature. An uncooperative combination of parameters, such as agitation speed, temperature, concentration of reactants, etc., can lead to an extended retention time, whereas a favorable combination can produce a desirable precipitate in a few minutes. The resulting slurry, containing precipitated alkali metal fluosilicate, is discharged from the mixer, with the solid alkali metal fluosilicate collected by sedimentation and processed further according to well known methods. The clarified defluorinated phosphoric acid solution can be removed and withdrawn for further processing or can be recycled, in whole or in part, for treatment with an alkali metal salt as described above. Thus, a portion of the clarified defluorinated acid can be combined with an alkali metal salt in the manner discussed above.

Following extraction of the contaminating anion, the solution of alkali metal phosphate in phosphoric acid, having a reduced content of contaminating anion, can be used directly to manufacture fertilizers or it can be recycled for contact with raw wet process acid. The amine-kerosene phase can be washed with water to remove water-soluble components from the extractant. Following water washing the amine can be regenerated by treatment with a water slurry of calcium oxide, the aqueous solution of calcium chloride being discarded. The regenerated amine phase can then conveniently be again washed to removed any last traces of calcium chloride and calcium oxide and recycled for further use in the extraction.

DESCRIPTION OF THE PREFERRED EMBODIMENTS

EXAMPLE 1

One ton of wet process phosphoric acid, containing 29% $P_2O_5$, 0.18% chloride, 0.59% Si and 2.4% fluorine was fed, together with 710 pounds of an approximately 17% solution of $NaH_2PO_4$ in phosphoric acid (29% $P_2O_5$) into a reactor. The retention time and temperature in the reactor were 30 minutes and 140° F, respectively. Agitation in the reactor was equivalent to a Reynolds number of 7800. The solids in the effluent from the reactor were settled from the solution. The supernatant clarified phosphoric acid was separated and split into two streams. One stream, consisting of 685 pounds, was mixed with 63.6 pounds of sodium chloride. This mixture was then extracted countercurrently with 3610 pounds of a solution of a 15 percent solution of an amine in kerosene, in three stages, the amines having the general formula $R_1 R_2 NH$, with $R_1$ being an aliphatic hydrocarbon group containing a tertiary carbon atom, with alkyl group substituents attached thereto and totalling from 11 to 14 carbon atoms in the three alkyl groups. $R_2$ is a straight chain, saturated alkyl group containing 12 carbon atoms. A compound such as this is sold by Rohm and Haas Company under the name of Amberlite LA-2. The resultant aqueous solution, consisting of sodium phosphate in phosphoric acid, ($Cl^- = 0.11$ percent), was similar to that fed to the reactor initially. The organic phase was washed with water and then treated with 48 pounds CaO in a water slurry. The aqueous solution of calcium chloride was discarded. The organic phase was then washed with water and recycled to the extraction step.

The remaining 2065 pounds of the original supernatant acid contained 28.1% $P_2O_5$, 0.57% fluorine (available fluorine values from any source, such as $F^-$ or $SiF_4$), 0.4% sodium, 0.15% Si and 0.16% chloride. This product can be further processed to make phosphatic fertilizer materials.

The settled solids were classified with water and the classifier overflow was returned to the reactor. The classifier solids were filtered, washed with water and dried, yielding 59.4 pounds of sodium fluosilicate of 99.4 percent purity ($< 0.1\% Cl^-$).

I claim:
1. A process for treating wet process phosphoric acid, which comprises:
   a. reacting clarified phosphoric acid with an alkali metal salt, in which the alkali cation is selected from the group consisting of lithium, sodium, potassium, rubidium and cesium, and the anion of the salt is selected from the group consisting of nitrate, sulfate, chloride, bromide and iodide, resulting in a solution comprising alkali metal phosphate, protonated anion of the metal salt and phosphoric acid;
   b. selectively and stoichiometrically extracting the thus-formed protonated anion from the above solution in which the extractant is an immiscible organic secondary or tertiary amine, in which at least one alkyl chain contains from about six to about 24 carbon atoms, and the amine is used in an amount to stoichiometrically extract the protonated anion;
   c. contacting the phosphate solution obtained from step (b) with wet process phosphoric acid, under mixing conditions characterized by a Reynolds number between about 7600 and about 8300, to precipitate an alkali metal fluosilicate, and
   d. separating the supernatant phosphoric acid, characterized by a reduced content of fluorine value and of contaminating anion.

2. A process according to claim 1 in which the alkali metal salt is sodium chloride or potassium chloride.

3. A process according to claim 1 in which the organic amine is a secondary amine having the general formula $R_1 R_2 NH$, in which $R_1$ is an aliphatic chain containing a tertiary carbon atom and $R_2$ is a straight chain saturated alkyl group containing about 12 carbon atoms.

4. A process according to claim 1 in which the supernatant phosphoric acid of step (d) is recycled for use as the clarified phosphoric acid of step (a).

5. A process for producing phosphoric acid and alkali metal fluosilicate, both substantially chloride free, which comprises:
   a. treating clarified phosphoric acid with an alkali metal chloride to form a mixture of alkali metal phosphate, phosphoric acid and hydrogen chloride, with the alkali metal selected from the group consisting of lithium, sodium, potassium, rubidium and cesium, b. extracting the mixture with an immiscible secondary or tertiary organic amine, in which at least one alkyl chain contains from about 6 to about 24 carbon atoms, used in an amount to stoichiometrically extract the hydrogen chloride, thereby reducing the chloride content of said mixture, c. contacting the resultant acidic alkali metal phosphate solution with wet process phosphoric acid, under mixing conditions characterized by Reynolds number between about 7600 and about 8300, to precipitate a substantially chloride-free alkali metal fluosilicate therefrom, and d. separating the phosphoric acid from the alkali metal fluosilicate, both being characterized by substantial freedom from chloride.

6. A process according to claim 5 in which the clarified phosphoric acid of step (a) contains from about 15% to about 35% by weight of $P_2O_5$, the alkali metal chloride is sodium or potassium chloride, and the immiscible organic amine is a secondary amine having the general formula $R_1 R_2 NH$ in which $R_1$ is a tertiary alkyl group containing from 11 to about 14 carbon atoms and $R_2$ is a straight chain saturated alkyl group containing about 12 carbon atoms.

* * * * *